(12) United States Patent
Gottsman

(10) Patent No.: US 8,341,194 B2
(45) Date of Patent: Dec. 25, 2012

(54) MATRIX-BASED USER INTERFACE AND SYSTEM FOR CREATING THE SAME

(75) Inventor: Edward J. Gottsman, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 2568 days.

(21) Appl. No.: 09/824,355

(22) Filed: Apr. 2, 2001

(65) Prior Publication Data

US 2002/0143772 A1 Oct. 3, 2002

(51) Int. Cl.
*G06F 17/30* (2006.01)
(52) U.S. Cl. ......... 707/805; 707/957; 345/629; 345/689
(58) Field of Classification Search .............. 707/1, 5, 707/3, 6, 4, 999.003, 999.005, 999.102, 716, 707/913, 726, 805, 957; 704/9; 345/947, 345/948, 173, 629, 689
See application file for complete search history.

(56) References Cited

U.S. PATENT DOCUMENTS

| | | | | |
|---|---|---|---|---|
| 5,544,354 A | * | 8/1996 | May et al. | 707/4 |
| 5,650,800 A | * | 7/1997 | Benson | 345/173 |
| 5,652,884 A | * | 7/1997 | Palevich | 713/1 |
| 5,963,940 A | * | 10/1999 | Liddy et al. | 707/5 |
| 6,026,388 A | * | 2/2000 | Liddy et al. | 707/1 |
| 6,327,395 B1 | * | 12/2001 | Hecht et al. | 382/306 |
| RE37,722 E | * | 5/2002 | Burnard et al. | 713/1 |
| 6,594,406 B1 | * | 7/2003 | Hecht | 382/306 |
| 6,867,788 B1 | * | 3/2005 | Takeda | 345/630 |

OTHER PUBLICATIONS http://www.smartmoney.com/marketmap/mapPage.cfm?showWeekStats=false; Dec. 8, 2000.
"Layered Windows", V. Gorokhovsky et al., Window User Interface Technical Articles, Jan. 2000 XP02354125.

* cited by examiner

*Primary Examiner* — Jean M Corrielus
(74) *Attorney, Agent, or Firm* — Vedder Price PC

(57) ABSTRACT

A system that includes a graphical user interface that may be used to access information contained in a database is provided. The graphical user interface includes a matrix of icons that correspond to textual excerpts. A textual excerpt is displayed above the matrix and the displayed textual excerpt changes as a user moves a pointing device over the icons. The user may perform searches of character strings contained in the textual excerpts. The color of the icons that correspond to textual excerpts that satisfy the search request is different from the color of the remaining icons. The interface also allows the user to rapidly and efficiently perform searches to retrieve information from the database.

11 Claims, 7 Drawing Sheets

MATRIX-BASED USER INTERFACE AND SYSTEM FOR CREATING THE SAME

FIELD OF THE INVENTION

The present invention relates to the field of user interfaces and systems for compiling executable computer files. More specifically, the present invention relates to user interfaces for permitting a user to view and rapidly search content in a database and to systems for compiling an executable computer file that permits a user to rapidly view and search content in a database.

BACKGROUND OF THE INVENTION

Computer databases are increasingly being used to store information. Unfortunately, it can often be difficult for a user to quickly obtain information relating to the content stored in a database. Typical database user interfaces require a user to enter a search string and, after a search of the database has been performed, a list of elements that contain the search string is displayed to the user. The search process can be time-consuming and a user may be forced to perform several searches before obtaining a small enough list of elements that can be read by the user. Furthermore, with typical database user interfaces, the user has no way of knowing how the particular elements are distributed within the database. For example, the user may not know that there is a relatively large number of elements listed under one subject and a relatively small number of elements listed under another related subject. Without this information, the user is unable to optimize the search process.

Therefore, there exists a need in the art for a database user interface that conveys information relating to the content of the database to the user and that allows the user to rapidly and efficiently retrieve relevant information from the database.

SUMMARY OF THE INVENTION

One aspect of the present invention provides a graphical user interface for rapidly viewing and searching a database or other collection of digital assets. The graphical user interface is implemented through a computer system, including a display and a user selection device. Information about the database is displayed in a matrix form presented to the user in at least one matrix area on the display. The matrix preferably includes a number of cells. The matrix also includes row headings and column headings, the row headings preferably indicating, for example, sources and the column headings preferably indicating, for example, the subject matter. Within each cell is displayed one or more icons, such as a small square, dot or other symbol, corresponding to an element of information in the database. The database elements may be text excerpts, graphic files or other media. The icons displayed within the matrix cells may have visually perceptible attributes to indicate, for example, whether or not a user has already viewed a particular excerpt in the database. The number of icons within each cell visually indicates to the user the number of database elements that correspond to a particular source and a particular subject matter. As a user activates the user selection device to move a graphic pointer over a particular one of the icons, the corresponding element is quickly displayed on the display. Thus, the matrix area represents to the user an overview of the database, organized by subject matter and source, and indicating the relative number of elements corresponding to each subject matter/source combination. Moreover, a user may quickly navigate and view information in the database by moving the pointer to a particular icon in a particular cell in the matrix. The user interface also preferably includes a search function, which permits the user to enter a search string and, in response, the icons corresponding to database elements containing the search string are modified in a visually perceptible manner to indicate to the user which database elements are responsive to the user's search.

According to another aspect of the invention, there is provided a novel system for compiling an executable file that provides a user interface for rapidly viewing and searching a database. A content translator preferably retrieves content from various sources, which may communicate with the translator over a local or wide area network, such as the Internet. The sources may include a news feed and a general database. The content translator generates an element database, which preferably contains elements that all have a common format. A content editor may also be provided to permit a user to edit or create content to be added to the element database. A compilation translator processes the element database to create an element library. In accordance with the invention, a compiler/linker compiles the element library and source code to create an executable file which, when executed, provides a user interface for rapidly viewing and searching a database. Because the element library is compiled with the source code, retrieval and searching of desired elements in the database may occur much more rapidly than would otherwise be attainable with prior-art compilation systems and methods.

In one embodiment that includes a computer system having a graphical user interface including a display and a user selection device, the advantages of the present invention are realized by a method of providing and selecting from icons on the display. The method includes the steps of: displaying in a matrix location a matrix of a plurality of icons, each icon corresponding to a file; displaying in a file location a file; and receiving an icon selection signal indicative of the user interface selection device pointing at one of the icons, and, in response to the selection signal, displaying a corresponding file in the file location.

In one embodiment, the file is a digital image file. In an alternative embodiment, the file is a textual excerpt. The matrix may include a source column identifying sources of the textual excerpts and a subject row identifying classifications of the textual excerpts.

The method may also include the steps of receiving a search request from a user; and changing a visually perceptive characteristic of icons that correspond to textual excerpts that satisfy the search request.

In another embodiment of the invention, a computer-readable medium having computer-executable instructions is provided. The computer-executable instructions are for performing the steps of displaying in a matrix location, of a display, a matrix of a plurality of icons, each icon corresponding to a file; displaying in a file location of the display a file; and receiving an icon selection signal indicative of the user interface selection device pointing at one of the icons, and, in response to the selection signal, displaying a corresponding file in the file location.

In yet another embodiment of the invention, a system that generates computer executable instructions is provided. The system includes a database of textual excerpts and a translator configured to combine the textual excerpts into a library file. A computer is configured to combine source code and the library file into a single executable file. The system may also include a content editor coupled to the database of textual excerpts.

BRIEF DESCRIPTION OF THE DRAWINGS

The present invention is illustrated by way of example and not limited in the accompanying figures in which like reference numerals indicate similar elements and in which.

DETAILED DESCRIPTION OF PREFERRED EMBODIMENTS

Figure 1:
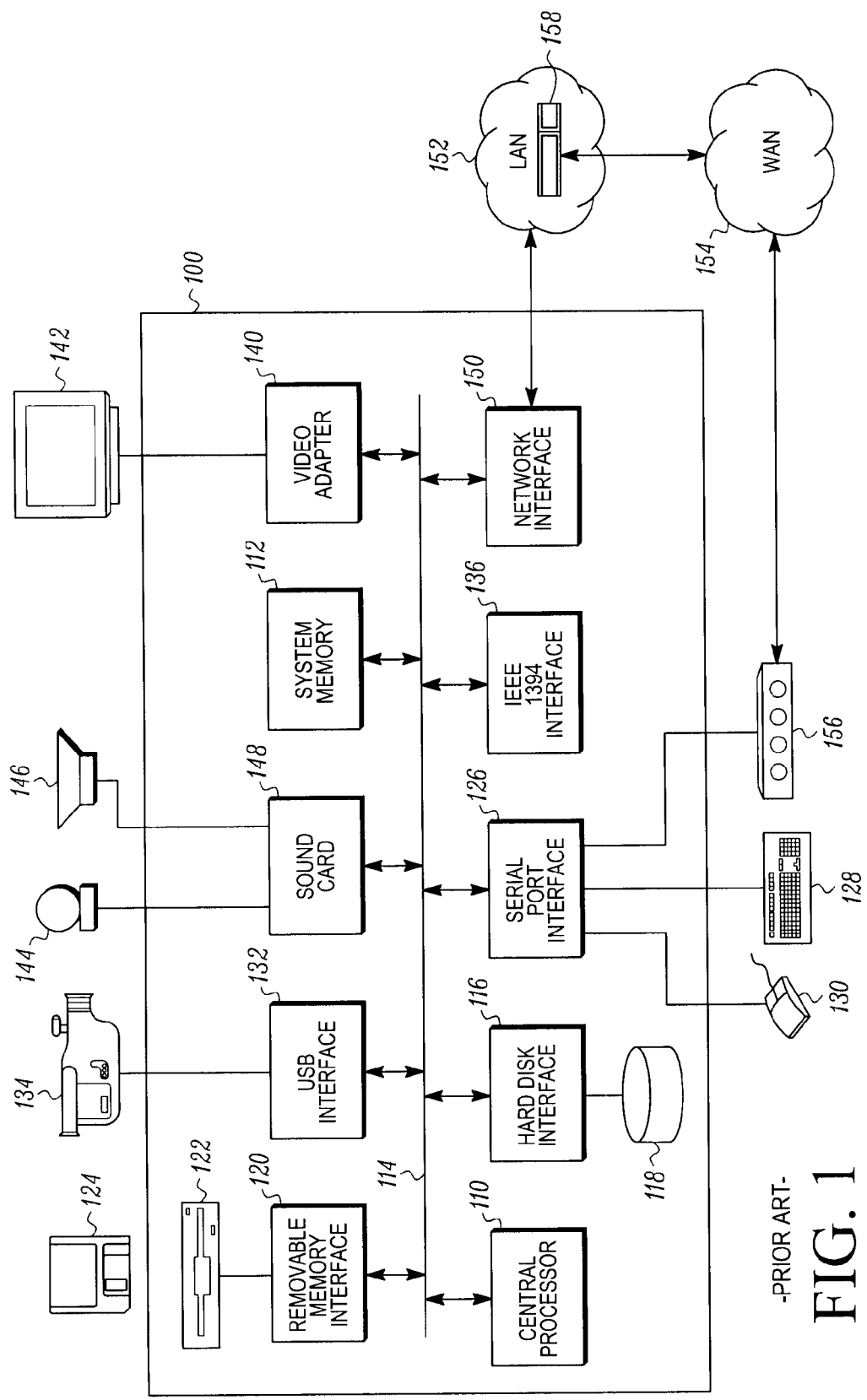
FIG. 1 shows a typical prior art workstation and communication connections.

The present invention may be embodied on a computer system, such as the system 100 shown in FIG. 1. Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

Figure 2:
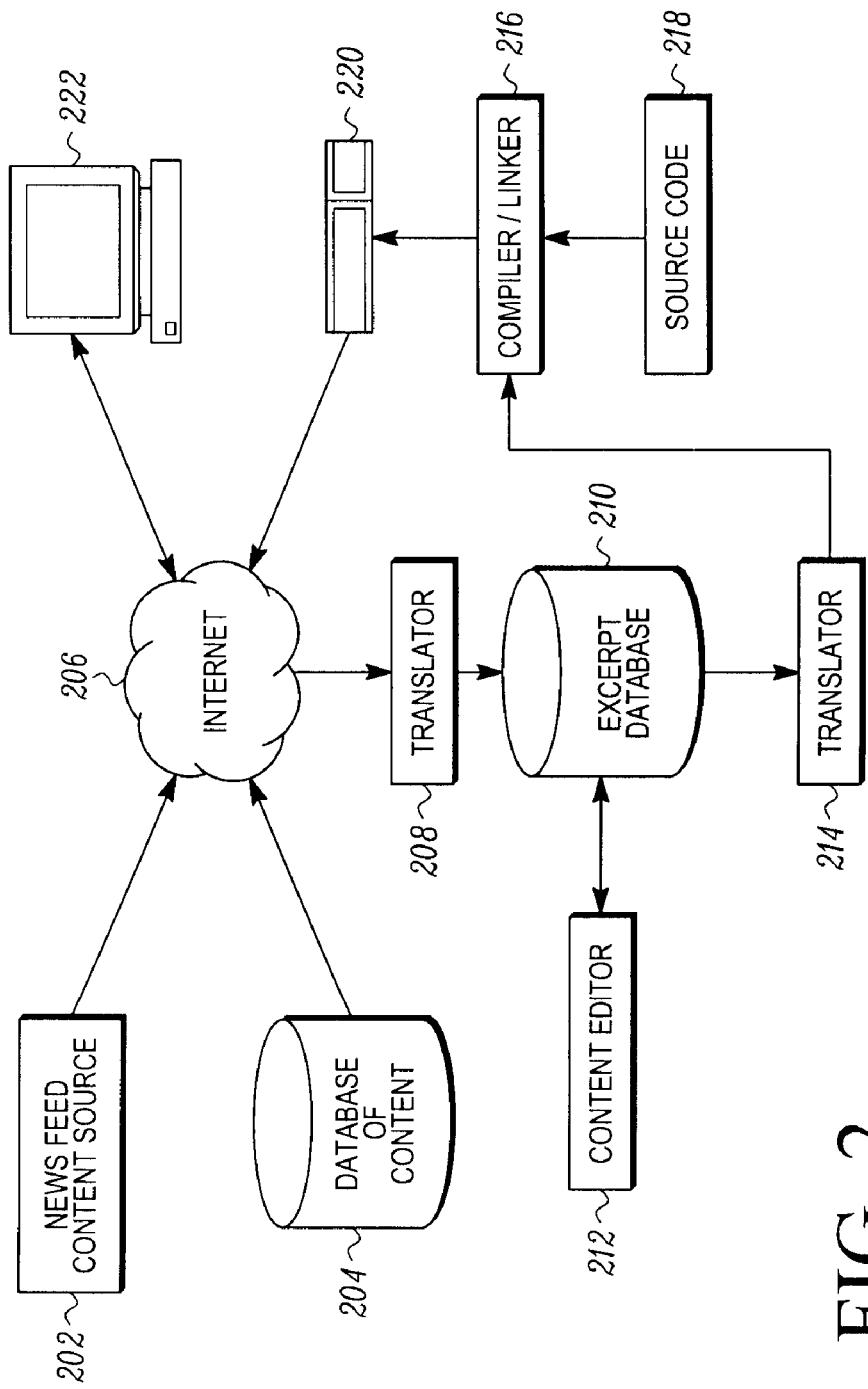
FIG. 2 shows a system that can be used to create and distribute matrix database executable files in accordance with one embodiment of the invention.

A system that can be used to generate an executable file in accordance with the present invention will first be described and then a resulting graphical user interface will be described. FIG. 2 shows a system that can be used to create and distribute matrix database executable files in accordance with one embodiment of the invention. A news feed 202 and a database of content 204 can be transmitted through a wide area network (WAN) 206, such as the Internet, to a translator 208. A single news feed 202 and a single database of content 204 are shown for illustration purposes only. The present invention may be used with a variety of different news feeds, databases, web sites or other sources of content. The content transmitted by news feed 202 and database 204 may be in a variety of different formats and may include a variety of different computer coding. For example, news feed 202 may transmit a story that is marked up with a markup language such as HTML, while database 204 may transmit a story in WordPerfect format.

Translator 208 receives the content transmitted from news feed 202 and database 204 and produces excerpts that may be stored in an excerpt database 210. Translator 208 operates in a conventional manner that is well-known to those skilled in the art. In particular, translator 208 may perform functions such as stripping computer code, truncating articles, identifying fields such as title and author and removing double carriage returns. While FIG. 2 shows a single translator 208, a separate translator may be included for each source of content. Of course, some sources of content may use the same translator.

A content editor 212 may also be used to provide content to database 210. In one embodiment of the invention, content editor 212 may be implemented with a database editor such as Lotus Notes. Content editor 212 may be particularly useful for creating and transmitting excerpts to database 210 that would not normally be received from a news feed or other source connected to a wide area network. For example, content editor 212 can be used to enter information that is particularly relevant to the employees of enterprise, such as confidential enterprise information.

In one embodiment, all of the excerpts included in database 210 have a common format. Fields such as the title, date, source and author of each excerpt may be identified. The fields may be identified by listing them in a predetermined order, including the fields between appropriate tags of a markup language or any other manner that identifies each field. Furthermore, each excerpt may be formatted to not exceed a predetermined length.

A compilation translator 214 retrieves excerpts from excerpt database 210 and creates a large file containing a large number of excerpts. In one embodiment of the invention, compilation translator 214 creates a C++ library file that essentially contains a data structure of a large number of excerpts. The use of the resulting library file will be described in detail below.

Next, a compiler/linker 216 receives a library file created by translator 214 and source code 218. Compiler/linker 216 may be installed on a computer (not shown) and the computer may be programmed to retrieve the library file in response to a command from a user or without a command from the user. Source code 218 may be a C++ program that contains computer executable instructions for creating a matrix database. Source code 218 may be configured to operate with a variety of different library files so that the configuration of source code 218 is independent of the library file created by translator 214. Compiler/linker 216 may create an executable file in a conventional well-known manner.

The executable file may be transmitted to a router 220 and then to wide area network 206. Finally, the executable file may be transmitted from wide area network 206 to a computer terminal 222. Of course, the executable file does not have to be transmitted through wide area network 206. In an alternative embodiment, computer terminal 222 may be connected to compiler/linker 216 by a local area network (LAN). The output of compiler/linker 216 may also be stored on a computer readable medium, such as a floppy disk, that may be used to transfer computer executable instructions to computer terminal 222.

There are several advantages that are obtained by distributing the matrix database in a single executable file as opposed to an executable file linked to one or more libraries. A single executable file allows for faster searching by a user. There is no need for the executable file to read a linked library and index the library before performing a search.

The matrix database stored on computer terminal 222 may be updated periodically. There are number of different methods that may be used to update the matrix database. In one embodiment of the invention, computer terminal 222 is programmed to periodically obtain new matrix databases from WAN 206. The determination as to when to update the matrix database may be based on factors such as the time since the last update and the amount of content that has been accessed by a user. In an alternative embodiment, the user may be provided with an option of manually requesting an updated matrix database from WAN 206.

Figure 3:
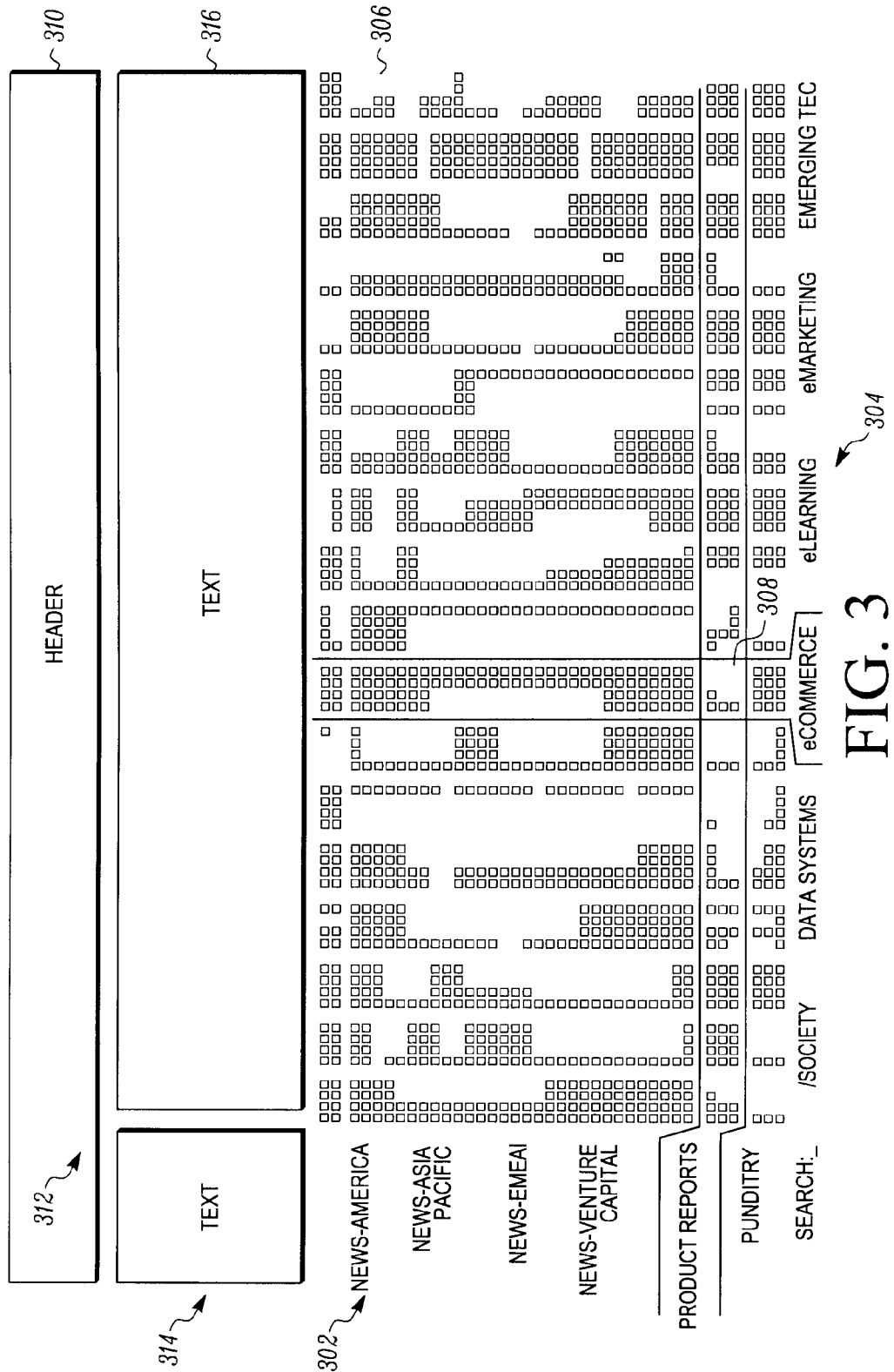
FIG. 3 shows a graphical user interface that can be used to retrieve and access information stored in a database.

FIG. 3 shows a graphical user interface that can be used to select content in accordance with one embodiment of the invention. A list of content sources are shown in column 302 and a list of topics and shown in row 304. Of course other indices such as publish date and author could be mapped to the axes. A user may use arrow keys or a pointing device, such as a mouse, to position a cursor over one of the squares shown in grid 306. Each square shown in grid 306 represents different pieces of content, such as an excerpt of an article.

One of the advantages of the present invention is that it allows the user to see a representation of all of the data included in the database and the distribution of data in that database. For example, block 308 includes four entries, which informs the user that there are four articles relating to the topic eCommerce from the source Product Reports. The color of each of the entries included within a block may also convey information to the user. For example, one color or shade may represent an article that has not been read by a user and another color or shade may represent articles that have been read by the user.

As described above with reference to FIG. 2, translator 208 identifies predetermined fields for each article, such as the title, author and date of publication. The interface shown in FIG. 3 places the identified fields in predetermined locations. For example, the source of the article may be positioned in a source location 310, the date of publication may be located in a date location 312 and the title may be positioned in the title location 314. The actual excerpt may be displayed in an excerpt section 316. In one embodiment of the invention, the user may press a key or select a button with a pointing device to expand the excerpt over the section where grid 306 is shown. One skilled in the art will appreciate that there are a number of different methods that may be used to create the interface shown in FIG. 3.

Figure 4:
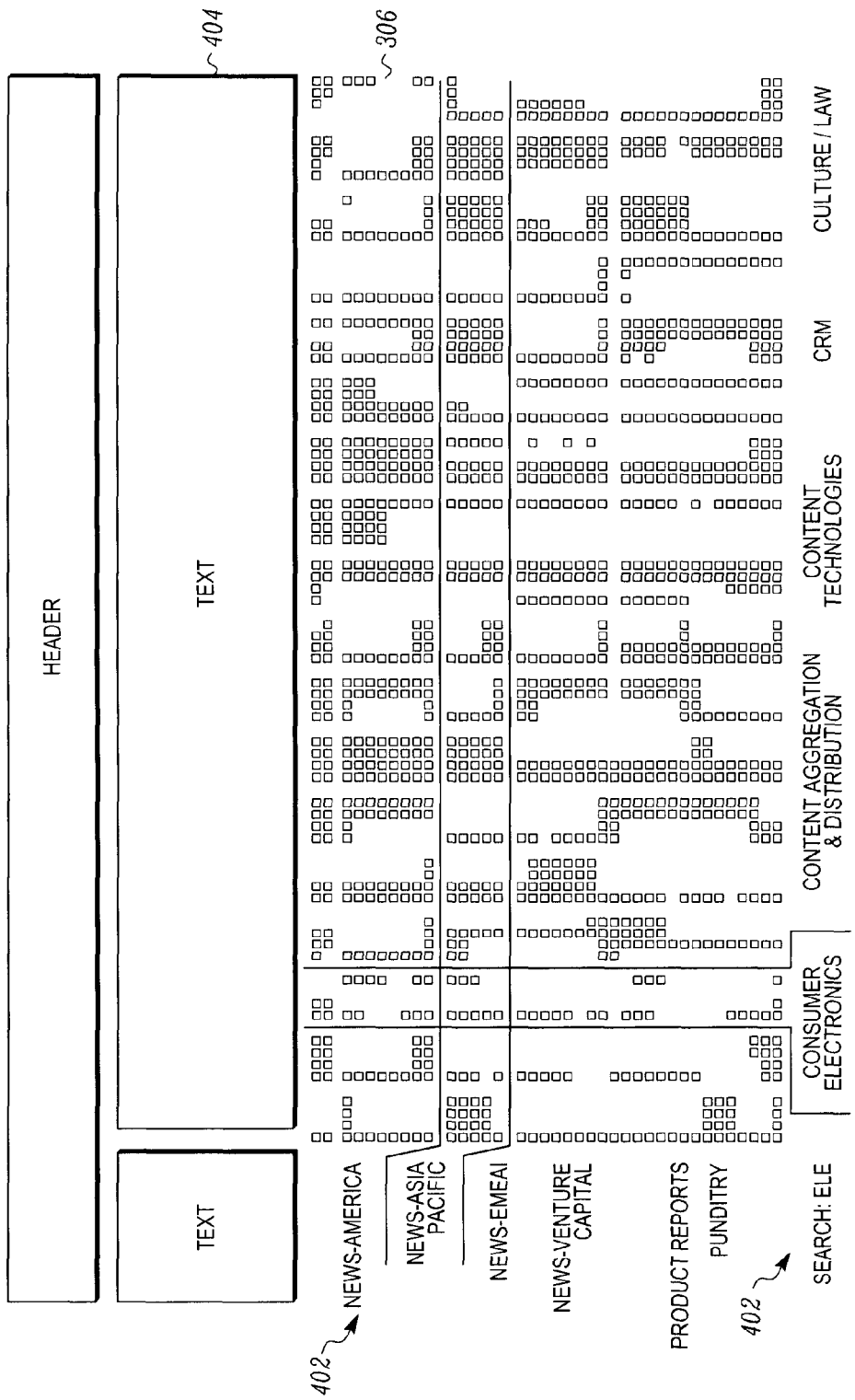
FIG. 4 shows the state of a graphical user interface during a search operation.

FIG. 4 illustrates how the present invention can be used to search a database. In particular, the user can enter a search string in a search entry section 402. As the user enters letters, the entries in grid 306 may change color to indicate whether or not the corresponding excerpt contains such a string. In the example shown in FIG. 4, the light colored boxes correspond to articles that contain words with the letters "ele." Furthermore, the sections of excerpt 404 that contain the letters "ele" may be highlighted.

As shown in FIG. 4, the user is able to retrieve an instant indication of the number of articles that contain the search string. One of the advantages of this type of interface is that it allows the user to instantly determine whether or not additional letters should be entered to narrow the search.

Figure 5:
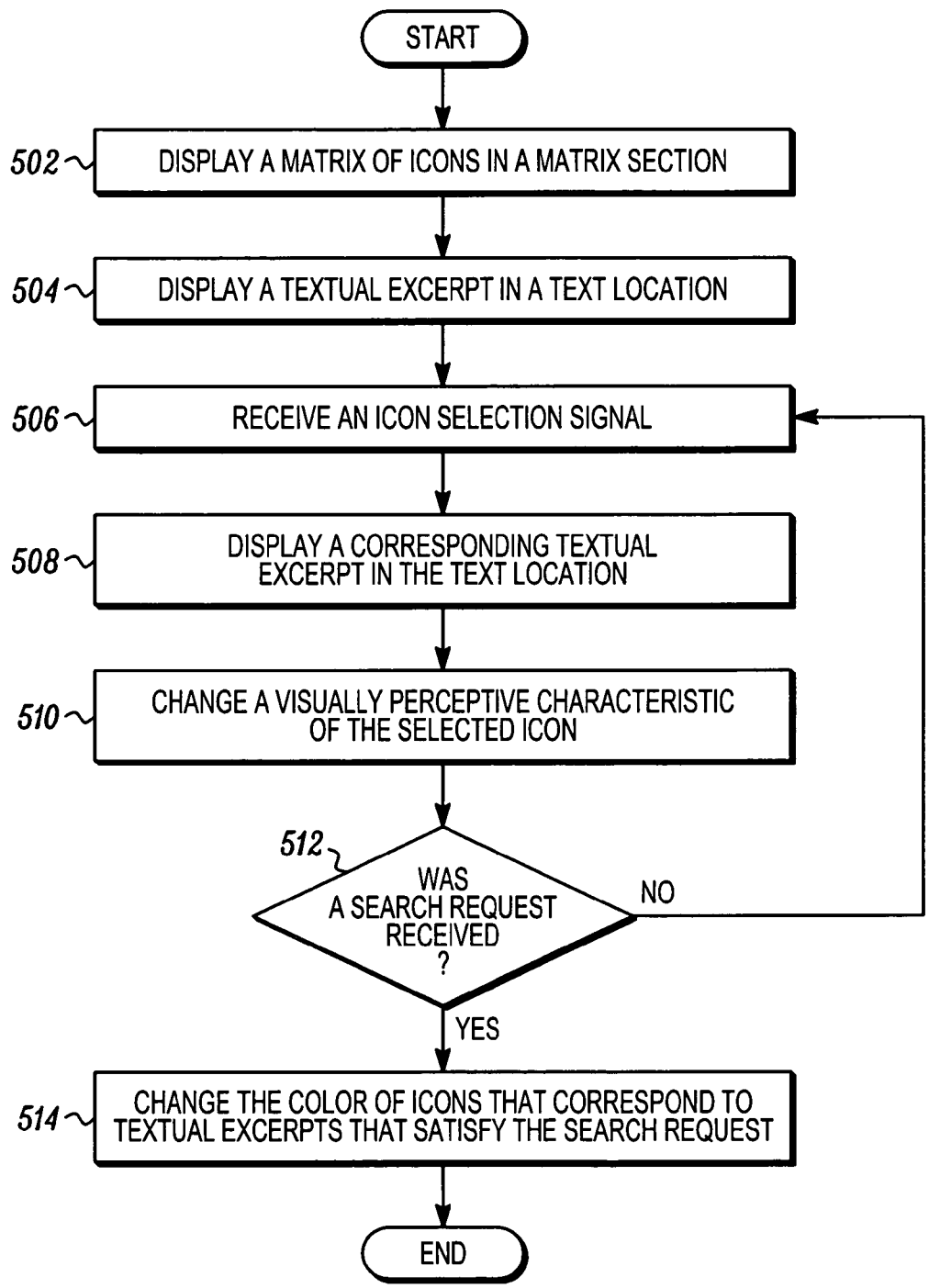
FIG. 5 shows a method that may be used to generate graphical user interfaces in accordance with an embodiment of the invention.

FIG. 5 illustrates a method that may be used to generate the graphical user interfaces shown in FIGS. 3 and 4 and to respond to commands from a user. First in step 502, a matrix of icons are displayed in a matrix location. Persons of skill in the art will understand that many different methods can be used to generate and display the matrix. Exemplary methods are discussed below and shown in FIGS. 6 and 7. After the matrix of icons is displayed in the matrix location in step 502, a textual excerpt is displayed in a text location in step 504. FIG. 3 shows matrix location 306 and text location 316. In step 506, an icon selection signal may be received. The icon selection signal may be generated in response to a user positioning a cursor over an icon. After receiving an icon selection signal, a corresponding textual excerpt is displayed in the text location in step 508. In step 510, the color or another visually perceptive characteristic of selected icons may be changed after an icon is selected to present the user with an indication of which icons have been selected.

A search may be initiated in step 512. As described above, the search may involve entering character strings. One skilled in the art will appreciate that the disclosed graphical user interface may be configured to perform other searches, such as searches relating to dates of publication, sources and subject matter. In step 514, the color or another visually perceptive characteristic of icons corresponding to textual excerpts that satisfy the search request is changed.

Figure 6:
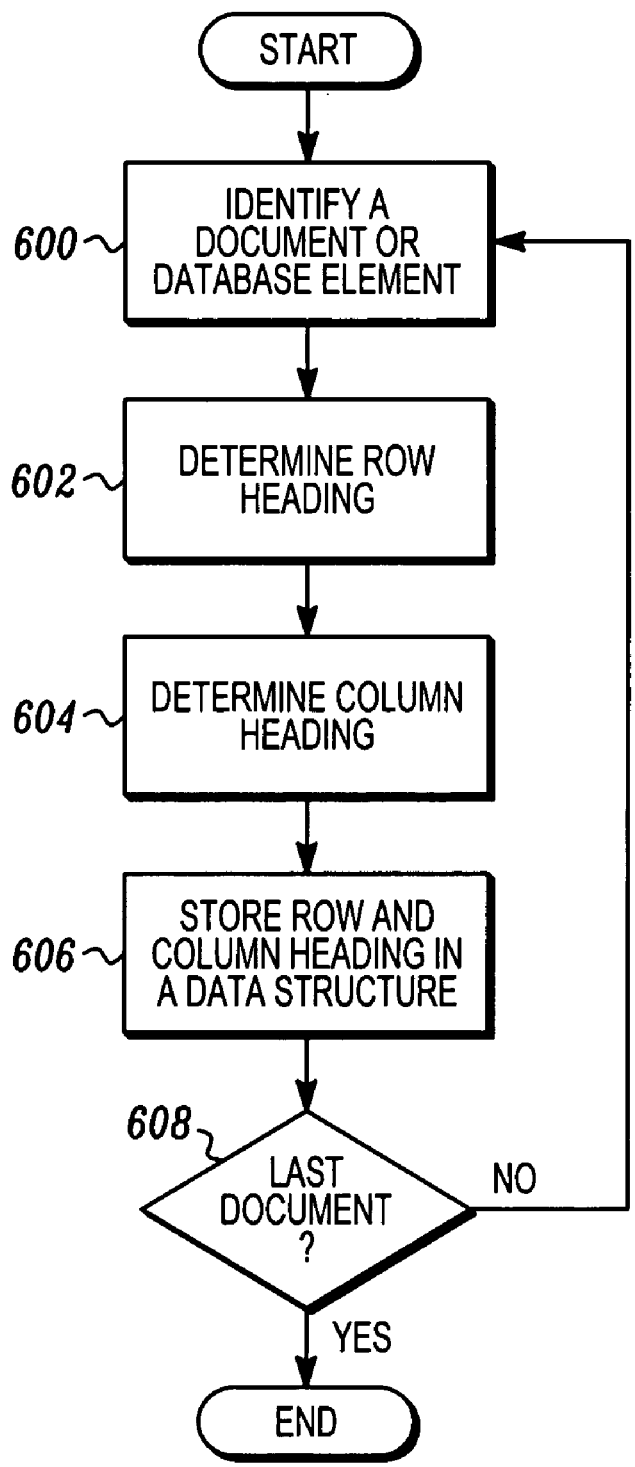
FIG. 6 illustrates an exemplary method of generating the data for the graphical user interface in one embodiment of the invention.

As previously mentioned, skilled artisans will understand that many different methods can be used to generate and display the matrix. FIG. 6 illustrates an exemplary method of generating the data for the matrix. This method can be automated if, for example, the documents or other database elements are indexed. Suitable indexes include, but are not limited, to field tags or field delimiators/symbols. Otherwise, the method can be manually implemented. Irrespective of whether the method is automated or manually implemented, an artisan can use the same steps. First, a document is first identified in step 600. Depending on the content of the document or one or more fields in the document, a determination is made in step 602 as to the appropriate row heading for the document. This row heading could, for example, correspond to the source of the document. Next, the content of the document or one or more fields in the document can be used to determine in step 604 the appropriate column heading for the document. The column heading could, for example, identify subject matter to which the document relates. The row and column headings could then be stored in step 606 in a data structure corresponding to the document or database element. This process could be repeated until all documents or database elements are categorized (i.e. row and column headings are assigned and stored for each document or database element) as illustrated in step 608.

Any data structure, database system, array, or pointer-based system could be used to store the row and column-heading categorizations for the documents or database elements. A sample data structure could be the C++ data structure shown below.

```
typedef struct mystructtag {
    int x; // column number
    int y; // row number
} nugget_struct;
```

In this structure, "x" is an integer value, which can correspond to column-heading assignment. Similarly, "y" is an integer value, which can identify a row-heading assignment. Of course, this data structure could include other variables associated with the documents. In this example, a separate data structure would correspond to each document or data element. An example is shown below. In this example, the data structures of all of the documents in system are stored in an array. However, the data structures could be stored in any manner desired. In this example, there are fifteen documents in the system, and therefore fifteen data structures stored in the array of data (i.e. one data structure for each document). The first value in each data structure corresponds to the variable "x" (i.e. the column heading) and the second value corresponds to the variable "y" (i.e. the row heading). These axis values (i.e. row and column assignments) are preferably listed sequentially in the source code as shown below.

```
nugget_struct MatrixGridData[ ]={
    0, 0, /* Directing Integration: Directories for the Masses */
    0, 0, /* Embedded EAI Process Automation Tools */
    0, 0, /* Skill Supply Drives Component Demand */
    0, 0, /* Help! How do I use the Accenture Information
        Source? */
    0, 0, /* The State of XML */
    0, 1, /* Fasten Your Seat Belt */
    0, 1, /* There Goes The Sun */
    0, 2, /* Bit-Serial Neuroprocessor Architecture */
    1, 0, /* B2B Sell Side: Lessons Learned from B2C */
    2, 1, /* Driving Online Car Sales */
    2, 1, /* Banking and Trading Online */
    3, 0, /* Wireless Internet Devices: From Phones to the
        Future */
    3, 0, /* PC and Handheld Markets—Projections for 2001
        */
    5, 0, /* Managing Digital Assets */
    7, 5, /* Accenture and election.com Announce Alliance
        to Market Services and
Solutions to Modernize Election Systems */
};
```

The label for each row and the label for each column can also be preferably stored in an array or other suitable structure. An exemplary C++ character array of possible column labels is shown below.

```
char *ColumnLabels[ ]={
    "Arch & Sys Dev",
    "B2B",
    "B2C",
    "Consumer Electronics",
    "Content A&D",
    "Content Tech",
    "Culture, Law, Society",
    "Data Systems",
    "eCommerce",
    "eLearning",
    "eMarketing",
    "Emerging Tech",
    "Enterprise Apps",
    "eServices",
    "Gaming",
    "Hardware",
    "Information Insights",
    "IT Operations",
```

"KM & Collaboration",
"Mobile Computing",
"Networking",
"New Media",
"Operating Systems",
"Security",
"Sensors & Biometrics",
"Storage",
"Strategy",
"Supply Chain",
"Telecoms & ISPs",
"Ubiquitous Comp",
};

A sample C++ character array of possible column labels is shown below.

```
char *RowLabels[ ]={
   "Analyst Reports",
   "By the Numbers",
   "News—Americas",
   "News—Asia Pacific",
   "News—EMEAI",
   "Splash",
};
```

Thus, for example, the document entitled "Directing Integration: Directories for the Masses" was assigned column 0 and row 0, and is therefore in the "Arch & Sys Dev" column and in the "Analyst Reports" row. Similarly, "Driving Online Car Sales" contains 2, 1 in its data structure and therefore would be in the "B2C" column and the "By the Numbers" row.

Figure 7:
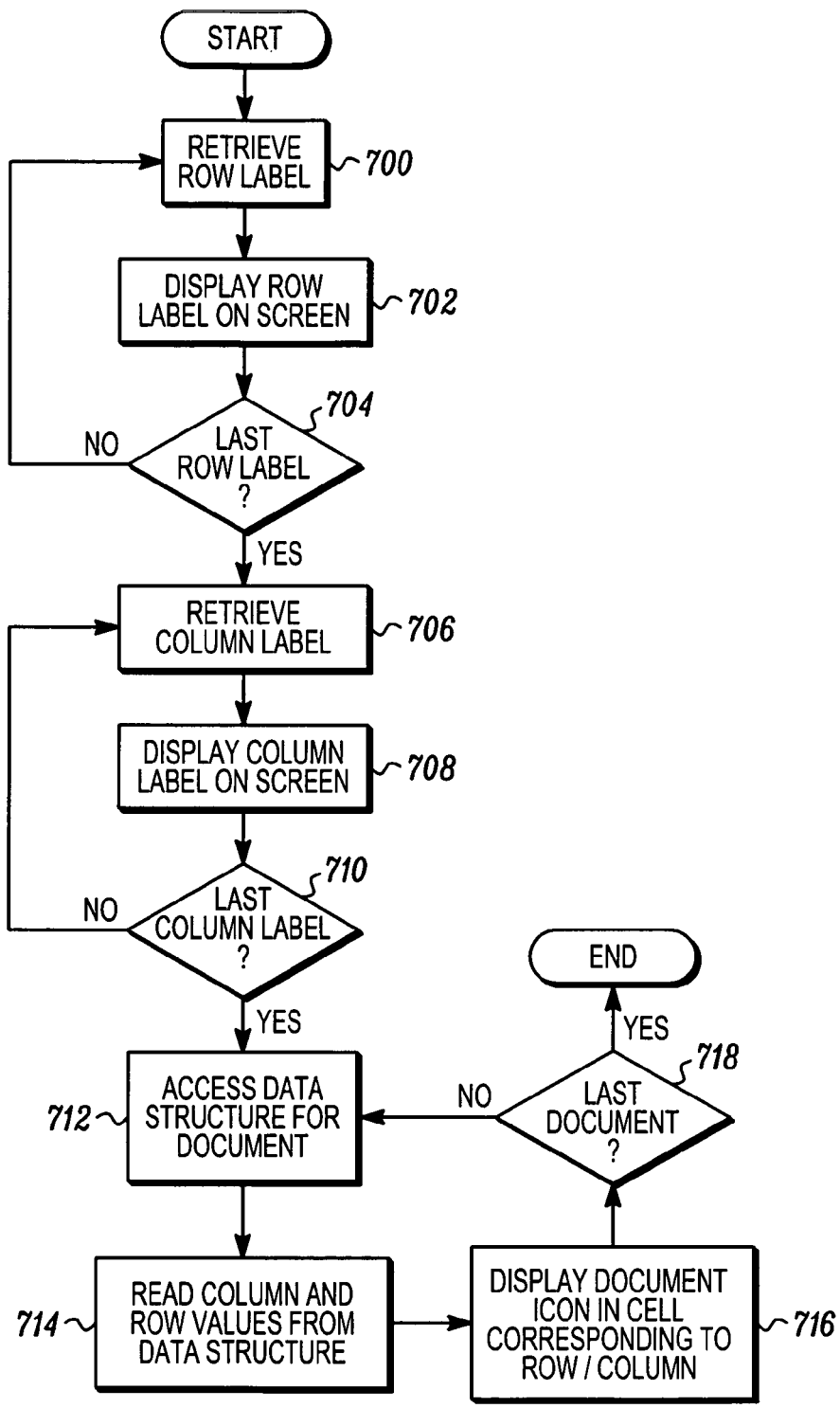
FIG. 7 illustrates a sample method of displaying the data for the graphical user interface in accordance with an embodiment of the invention.

After the data for the matrix is generated, the matrix can then be displayed. FIG. 7 illustrates an exemplary method of displaying the matrix. Again, skilled artisans will readily appreciate that any method could be used to display the matrix. For example, the array of row labels or headings for the matrix could be displayed on the screen. This could occur in step 700 by retrieving the first row label (i.e. RowLabels[0]) from the array storing the row labels. The row label could then be displayed in step 702. As shown in step 704, the process could repeat until either all row labels are displayed or insufficient room remains on the screen to display all row labels. Next, the first column label (i.e. ColumnLabels[0]) could be retrieved in step 706. The column label would be displayed in step 708 and the process could repeat until all column labels are displayed or insufficient room remains on the screen to display all column labels 710.

Alternatively, the row and column labels might only be displayed when a mouse or user-selection device is located over a corresponding document. For example, when a user positions a cursor over the icon for the "Directing Integration: Directories for the Masses," the "Arch & Sys Dev" column label and/or in the "Analyst Reports" row label might only be displayed. Or, the row labels might always be displayed, and only column label would be displayed that corresponds to the document icon over which the cursor is currently position. Any variation of these is contemplated and within the scope of the invention.

Next, the data structure corresponding to the first document available to be displayed could be accessed in step 712. The column and row values (i.e. the "y" and "x" values) for that document could be read from the data structure in step 714. A dot, square or other symbol could then be displayed in the cell corresponding to the specific column and row combination in step 716. For example, a dot could be placed in the cell for the "Arch & Sys Dev" column and the "Analyst Reports" row for the document entitled "Directing Integration: Directories for the Masses." As shown in step 718, this process could be repeated until dots for all documents are displayed on the screen—depending, of course, on the available area on the screen to display the quantity of documents, row labels and column labels.

As discussed above, there are number of different ways to implement the graphical user interface in accordance with the present invention. For example, the graphical user interface may be implemented as a stand-alone software program for accessing information stored in a database, as a screen saver or as part of another software program. When used as a screen saver, the interface may be programmed to randomly select excerpts included in the database to display in section 316. Another advantage of using the interface as a screen saver is that it allows the user to rapidly obtain information that may be needed during a meeting. The content included in the database may be the type of content that may be relevant to the particular meeting and the user may rapidly obtain information on a subject or perform searches to obtain information without going through a burdensome search process. An example of using the disclosed graphical user interface with another software program includes using the interface to allow the user to access help topics included within a help menu of the software program.

The speed with which a user can search and retrieve excerpts is a function of many factors. One way to optimize the speed of the graphical user interface is to bypass most of the elaborate native user interface facilities provided by most operating systems. Interface facilities such as scroll bars, windows and menus consume processor capabilities and can slow down the performance of the graphical user interface.

The present invention may be used with a variety of different files in a variety of different formats. In addition to text files, files such as digital image files and executable files may be accessed by the disclosed matrix graphical user interface. Furthermore, a single matrix graphical user interface may provide access to several different file types.

While the present invention has been described in connection with the illustrated embodiments, it will be appreciated and understood that modifications can be made without departing from the true spirit and scope of the invention.

I claim:

1. In a computer system having a graphical user interface including a display and a user selection device, a method of permitting a user to quickly view elements in a database comprising:
   (a) displaying in a matrix area on the display a matrix having a plurality of cells and a plurality of icons displayed in one or more of the cells, the matrix including displayed row headings and column headings and each icon corresponding to an element in the database;
   (b) receiving an icon selection signal in response to a user selecting one of the icons with the user interface selection device; and
   (c) in response to the icon selection signal, displaying a corresponding element.

2. The method of claim 1, further including the step of changing a visually perceptive characteristic of one of the icons in response to receiving the icon selection signal.

3. The method of claim 1, further including:
   (d) receiving from the user a search request input from a user input device; and
   (e) changing a visually perceptive characteristic of icons that correspond to elements that satisfy the search request.

4. The method of claim 1, further including the step of periodically changing, without intervention by the user, the element that is displayed.

5. The method of claim 1, wherein the element comprises a digital image.

6. The method of claim 1, wherein the element comprises a textual excerpt.

7. The method of claim 1, further including:
   (d) displaying in a title location a title relating to the element; and
   (e) displaying in a source location a source of the element.

8. The method of claim 1, wherein the user selects the icon by superimposing a pointing indicator on the icon.

9. A computer-readable medium having computer-executable instructions for performing:
   (a) displaying in a matrix location of a display a matrix of a plurality of icons, the matrix including displayed row headings and column headings and each icon corresponding to a file;
   (b) displaying in a file location of the display a file;
   (c) receiving an icon selection signal indicative of the user interface selection device pointing at one of the icons, and, in response to the selection signal, displaying a corresponding file in the file location.

10. The computer-readable medium of claim 9, further including computer-executable instructions for performing:
   (d) receiving a search request from a user; and
   (e) changing a visually perceptive characteristic of icons that correspond to files that satisfy the search request.

11. In a computer system having a graphical user interface including a display and a user selection device, a method of permitting a user to quickly view elements in a database comprising:
   (a) displaying in a matrix area on the display a matrix having a plurality of cells and a plurality of icons displayed in one or more of the cells, the matrix including displayed row headings and column headings and each icon corresponding to an element in the database, wherein the row headings identify sources from which the elements are obtained and the column headings identify subject matter to which the elements relate;
   (b) receiving an icon selection signal in response to a user selecting one of the icons with the user interface selection device; and
   (c) in response to the icon selection signal, displaying a corresponding element.

* * * * *